No. 788,972. PATENTED MAY 2, 1905.
W. C. WEATHERHOLT.
COMBINED MUFFLER AND FLY WHEEL FOR ENGINES.
APPLICATION FILED JAN. 23, 1905.
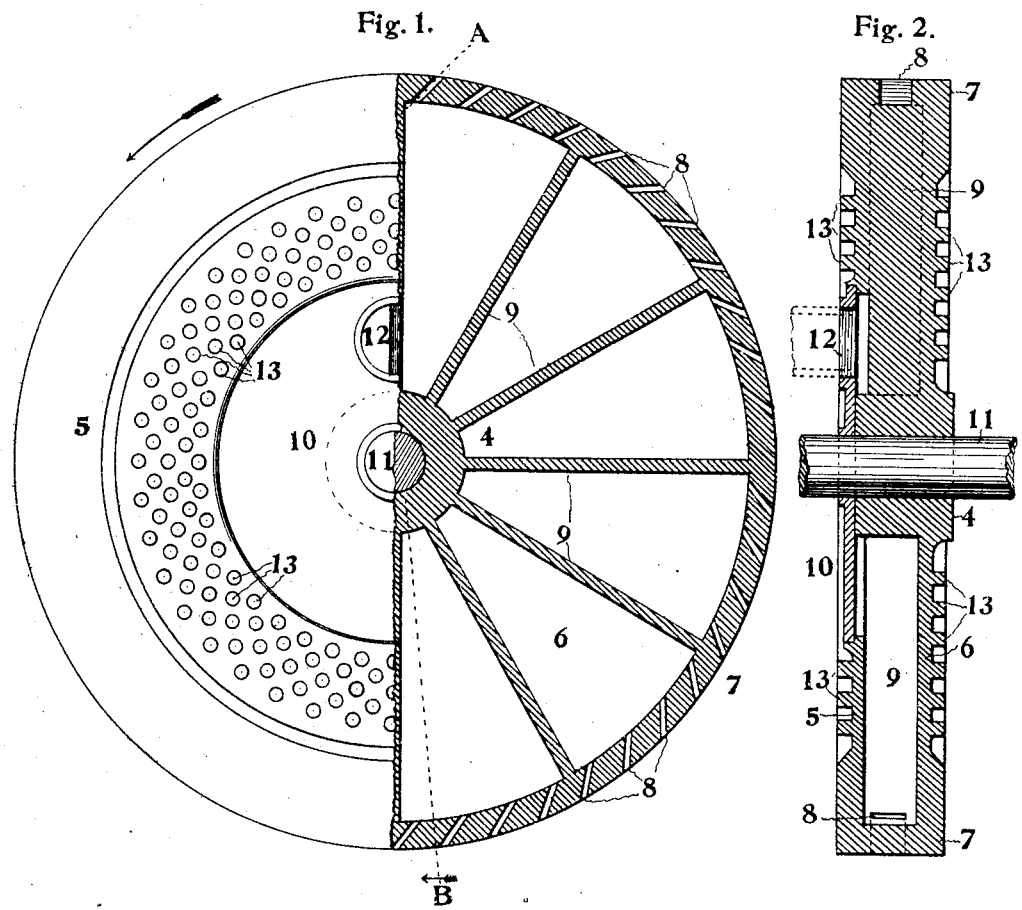

No. 788,972. Patented May 2, 1905.

UNITED STATES PATENT OFFICE.

WILLIAM CLARK WEATHERHOLT, OF FENTON, MICHIGAN.

COMBINED MUFFLER AND FLY-WHEEL FOR ENGINES.

SPECIFICATION forming part of Letters Patent No. 788,972, dated May 2, 1905.

Application filed January 23, 1905. Serial No. 242,304.

*To all whom it may concern:*

Be it known that I, WILLIAM CLARK WEATHERHOLT, a citizen of the United States, and a resident of Fenton, in the county of Genesee and State of Michigan, have invented a Combined Muffler and Fly-Wheel for Engines, of which the following is a specification.

This invention is intended more particularly for use with explosion-engines and provides means whereby the fly-wheel or other equivalent part is utilized as a muffler for such motors, whereby the noise made by the exhaust is obviated, and as in operation the exhaust is drawn from the motor there will be no back pressure or liability of throttling and the efficiency of the engine will be materially increased without the addition of parts that are liable to get out of order.

In the accompanying drawings, which illustrate one embodiment of my invention, Figure 1 is a side elevation partly in section, and Fig. 2 is a section on the line A B of Fig. 1.

The main portion of the combined muffler and fly-wheel is preferably cast to provide a hub 4, side plates 5 and 6, a rim 7, having therethrough tangential openings 8, and interior partitions or division-walls 9, which radiate from the hub and extend to the inner side of the rim. One of the sides 6 of the hollow member or fly-wheel 3 has an opening that is shaped to receive a fixed or stationary plate 10, through which the shaft 11 passes. The face-plate 10 closes the opening through the side with the exception of an opening 12 for the attachment of the exhaust-pipe of the engine. Each of the side walls of the fly-wheel or other rotary member has a number of heat-radiating nibs or projections 13. The fly-wheel or other rotary part may be built up from several parts or it may be cast in one piece with an open side, as shown.

In use the exhaust is delivered to the internal divisions of the wheel through the opening in the face-plate. The exhaust expands in the diverging chambers and is discharged from the larger part thereof through the tangential discharge-openings. The fly-wheel or pulley, which is fast upon the driven shaft, revolves in the direction indicated by the arrow, and the discharge-openings being in the direction shown the rotation of the wheel tends to draw from the compartments through the tangential openings the products of combustion, which are discharged without noise. As the wheel revolves a partial vacuum will be produced in the compartments or chambers of the wheel, which expedites clearing the exhaust therefrom and prevents back pressure.

The device shown provides a very efficient muffler and is practically combined with the fly-wheel as the rotation of the wheel sucks or draws the exhaust from the engine.

Having thus set forth my invention, what I claim as new, and desire to secure by Letters Patent, is—

1. A hollow rotary member of an engine or motor comprising a plurality of chambers, discharge-apertures for the chambers which extend through the periphery of the rotary member, and a non-rotary part having an opening through which the exhaust products are delivered successively to the chambers.

2. A hollow fly-wheel having peripheral discharge-openings, a plurality of partitions between the rim and the hub of the wheel, and a face-plate having an intake-opening.

3. A fly-wheel which is interiorly divided into sector-shaped chambers, a face-plate having an opening therethrough and tangential discharge-openings for each chamber.

4. In a combined muffler and fly-wheel, a stationary plate having an intake-opening for the exhaust of the motive power of an engine, a hollow rotary member which is divided internally into non-communicating sector-shaped chambers and a plurality of tangential and peripherally-located discharge-openings for each chamber.

5. In a muffler for engines, a hollow rotary member having a stationary part with an opening which is connected with the exhaust-port of an engine, discharge-openings through the periphery of the hollow member which are positioned to produce a partial vacuum in the hollow member when rotated.

In testimony whereof I have signed my name to this specification in the presence of two subscribing witnesses.

WILLIAM CLARK WEATHERHOLT.

Witnesses:
F. H. HITCHCOCK,
E. D. KENNEDY.